(12) United States Patent
Sakamoto et al.

(10) Patent No.: US 12,736,471 B2
(45) Date of Patent: Sep. 15, 2026

(54) OPTICAL SENSOR AND PHYSICAL QUANTITY MEASUREMENT DEVICE HAVING A SENSOR HEAD FIRMLY BONDED TO A BASE

(71) Applicant: NAGANO KEIKI CO., LTD., Tokyo (JP)

(72) Inventors: Ayumu Sakamoto, Tokyo (JP); Keiichi Fujita, Tokyo (JP); Tsutomu Yamate, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 472 days.

(21) Appl. No.: 18/258,395

(22) PCT Filed: Dec. 15, 2021

(86) PCT No.: PCT/JP2021/046194
§ 371 (c)(1),
(2) Date: Jun. 20, 2023

(87) PCT Pub. No.: WO2022/138361
PCT Pub. Date: Jun. 30, 2022

(65) Prior Publication Data

US 2024/0035965 A1 Feb. 1, 2024

(30) Foreign Application Priority Data

Dec. 23, 2020 (JP) ................................ 2020-213510

(51) Int. Cl.
*G01N 21/45* (2006.01)

(52) U.S. Cl.
CPC .................................. *G01N 21/45* (2013.01)

(58) Field of Classification Search
CPC ........ G01N 21/45; G01D 3/036; G01D 5/268; G01D 5/266; G01K 11/3206; G01L 9/0079; G01L 11/025; G01L 19/0092
See application file for complete search history.

(56) References Cited

U.S. PATENT DOCUMENTS 5,452,087 A 9/1995 Taylor et al.
6,141,098 A 10/2000 Sawatari et al.
12,104,933 B2 * 10/2024 Sakamoto ................ G01L 5/24
(Continued)

FOREIGN PATENT DOCUMENTS

CN 1699933 A * 11/2005
JP 2007-532871 A 11/2007
(Continued)

OTHER PUBLICATIONS

Liu et al. (Year: 2005).*
(Continued)

*Primary Examiner* — Hwa Andrew Lee
(74) *Attorney, Agent, or Firm* — Rankin, Hill & Clark LLP

(57) ABSTRACT

An optical sensor includes: a metal base formed into a cylindrical shape; an optical fiber member inserted into the base; and a sensor head that is bonded to the base and is optically connected to the optical fiber member, the sensor head including a head portion formed from monocrystalline alumina, in which the base includes a fitting portion into which the sensor head is inserted, and the sensor head is bonded to the fitting portion via a bonding member.

9 Claims, 7 Drawing Sheets

(56) References Cited

U.S. PATENT DOCUMENTS

| | | | | |
|---|---|---|---|---|
| 2007/0006663 | A1* | 1/2007 | Zerwekh | G01L 9/0077 374/E11.016 |
| 2007/0058171 | A1* | 3/2007 | Berg | G01N 21/474 356/446 |
| 2009/0151423 | A1 | 6/2009 | Wu et al. | |
| 2010/0321703 | A1 | 12/2010 | Harpin et al. | |
| 2020/0191823 | A1* | 6/2020 | Seidel | G01P 5/165 |

FOREIGN PATENT DOCUMENTS

| | | | |
|---|---|---|---|
| JP | 2009-513935 | A | 4/2009 |
| JP | 2020-095023 | A | 6/2020 |
| WO | 2019/142006 | A1 | 7/2019 |
| WO | 2020/223079 | A1 | 11/2020 |

OTHER PUBLICATIONS

International Search Report, International Application No. PCT/JP2021/046194, Date of mailing: Feb. 22, 2022, 2 pages.

European Search Report issued in Corresponding European Patent Application No. 21910509.5, dated Aug. 28, 2024, 9 pages.

International Preliminary Report on Patentability corresponding to International Application No. PCT/JP2021/046194, dated Jun. 13, 2023, 6 pages.

* cited by examiner

OPTICAL SENSOR AND PHYSICAL QUANTITY MEASUREMENT DEVICE HAVING A SENSOR HEAD FIRMLY BONDED TO A BASE

TECHNICAL FIELD

The present invention relates to an optical sensor and a physical quantity measuring device.

BACKGROUND ART

There is conventionally known an optical sensor in which a sensor head and a base that supports the sensor head are formed from sapphire having high physical/chemical strength (for example, Patent Literature 1).

In Patent Literature 1, the sensor head and the base formed from sapphire allow for measurement of a high-temperature/high-pressure target fluid.

CITATION LIST

Patent Literature

Patent Literature 1: Specification of United States Patent Application Publication No. 2009/0151423

SUMMARY OF THE INVENTION

Problem to be Solved by the Invention

When the sensor head is not firmly bonded to the base, a bonding portion where the sensor head is bonded to the base may be damaged in measuring the high-temperature/high-pressure target fluid.

In this regard, Patent Literature 1 describes that a wall portion of the sensor head is bonded to the base, but fails to describe a detailed bonding structure thereof.

Thus, there is a demand for a structure capable of firmly bonding the sensor head to the base.

An object of the invention is to provide an optical sensor and a physical quantity measuring device capable of firmly bonding a sensor head to a base.

Means for Solving the Problem

According to an aspect of the invention, there is provided an optical sensor that includes: a metal base formed into a cylindrical shape; an optical waveguide inserted into the base; and a sensor head that is bonded to the base and is optically connected to the optical waveguide, the sensor head including a head portion formed from monocrystalline alumina, in which the base includes a fitting portion into which the sensor head is inserted, and the sensor head is bonded to the fitting portion via a bonding member.

According to the aspect of the invention, the base includes the fitting portion into which the sensor head is inserted. With the sensor head inserted into the fitting portion of the base, the fitting portion is bonded to the sensor head via the bonding member. This makes it possible to firmly bond the sensor head to the base.

Further, the sensor head is formed from monocrystalline alumina in a form of sapphire having high physical/chemical strength, thus inhibiting the sensor head from being damaged even when the temperature and pressure of a target fluid are high. Furthermore, since the base is formed from a metal, processing of the base is easier than a case where the base is formed, for example, from sapphire, at lower manufacturing costs. Accordingly, it is possible to provide the optical sensor with high physical/chemical strength that is easy to be processed.

In the optical sensor according to the aspect of the invention, the head portion is preferably provided with a cavity having a first reflection surface on which a portion of light introduced from the optical waveguide is reflected and a second reflection surface on which a portion of the light introduced from the optical waveguide is reflected, the first reflection surface being provided opposite to the second reflection surface, and interference light obtained by interference between the light reflected on the first reflection surface and the light reflected on the second reflection surface is preferably output from the cavity to the optical waveguide.

In this configuration, the head portion of the sensor head that comes into contact with a target fluid has the cavity from which the interference light obtained by interference between the light reflected on the first reflection surface and the light reflected on the second reflection surface is output to the optical waveguide. Thus, a physical quantity of the target fluid such as the pressure and temperature is detectable by analyzing the interference light.

In the optical sensor according to the aspect of the invention, a distance between the first reflection surface and the second reflection surface preferably depends on pressure of a target fluid.

In this configuration, since the interference light output from the cavity mainly depends on the pressure of the target fluid, the pressure of the target fluid is detectable by analyzing the interference light.

In the optical sensor according to the aspect of the invention, the sensor head preferably includes a columnar portion formed into a columnar shape, and a circumferential surface of the columnar portion is preferably bonded to the fitting portion via the bonding member.

In this configuration, the columnar portion of the sensor head that is different from the head portion is inserted into the fitting portion and bonded thereto via the bonding member. Since the head portion is not bonded to the fitting portion, the effect on the physical quantity detection is inhibited which may otherwise be caused by the bonding of the head portion to the fitting portion.

In the optical sensor according to the aspect of the invention, the base preferably includes a supporting portion supporting the sensor head.

In this configuration, the base includes the supporting portion that supports the sensor head. Thus, even when high stress acts on the sensor head, the high stress can be supported by the supporting portion. This makes it possible to more firmly bond the sensor head to the base.

In the optical sensor according to the aspect of the invention, the supporting portion is preferably bonded to the sensor head via a welding member.

In this configuration, since the supporting portion is bonded to the sensor head via the welding member, the sensor head is reliably fixed by use of the base.

In the optical sensor according to the aspect of the invention, the base preferably includes a base body into which the optical waveguide is inserted and a connecting portion extending from the base body, and the fitting portion formed into a cylindrical shape is preferably provided at a side close to a distal end of the connecting portion; the base body, the connecting portion, the fitting portion, and the sensor head preferably define a space; and the connecting portion is preferably larger in thickness than the fitting portion, and an inner circumferential surface exposed to the space of the connecting portion preferably has a curved shape.

In this configuration, the inner circumferential surface of the connecting portion provided between the base body and the fitting portion has a curved shape. This makes it possible to inhibit stress from concentrating on between the base body and the fitting portion compared, for example, to a case where a corner is provided between the base body and the fitting portion. Thus, a proximal end of the fitting portion is inhibited from being damaged which may otherwise be caused by stress concentration.

According to another aspect of the invention, there is provided a physical quantity measuring device including: a light source; an optical sensor, which includes a metal base formed into a cylindrical shape, an optical waveguide that is optically connected to the light source and is inserted into the base, and a sensor head that is bonded to an end of the base and is optically connected to the optical waveguide, the sensor head including a head portion formed from monocrystalline alumina; a light detector configured to detect an interference signal from interference light output from the optical sensor; and an arithmetic unit configured to calculate a physical quantity of a target fluid from the interference signal detected by the light detector, in which the base includes a fitting portion into which the sensor head is inserted, and the sensor head is bonded to the fitting portion via a bonding member.

According to the aspects of the invention, effects similar to the above effects can be obtained.

DESCRIPTION OF EMBODIMENTS

First Exemplary Embodiment

A first exemplary embodiment of the invention is described below based on the attached drawings.

Figure 1:
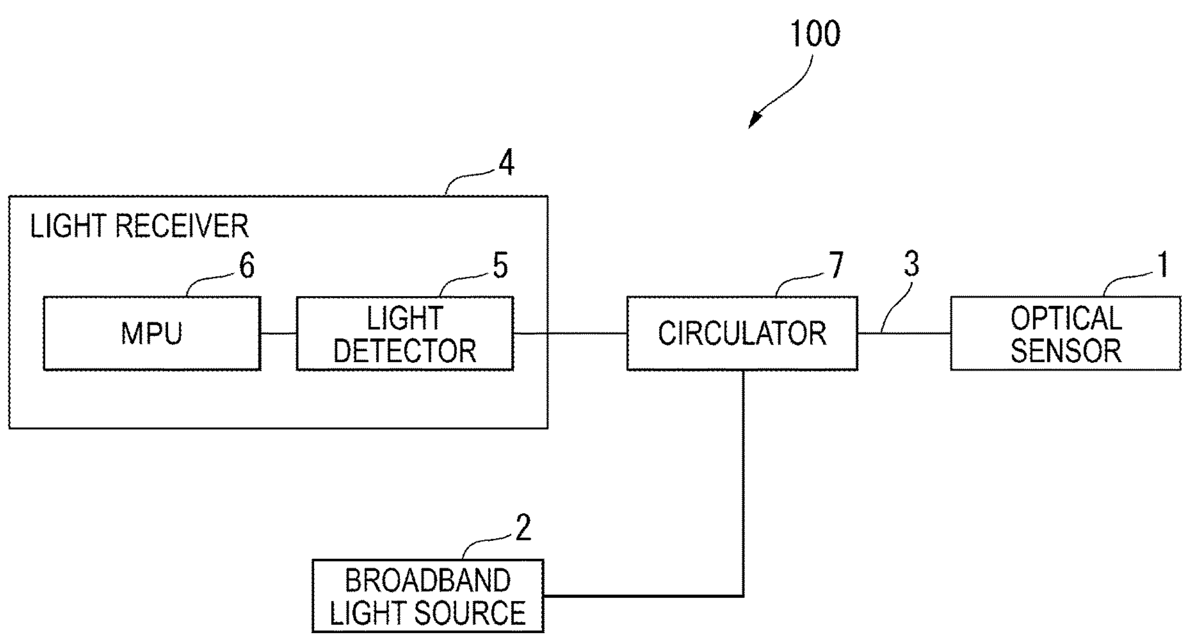
FIG. 1 schematically illustrates a structure of a physical quantity measuring device according to a first exemplary embodiment of the invention.

FIG. 1 schematically illustrates a structure of a physical quantity measuring device 100 of the first exemplary embodiment.

As illustrated in FIG. 1, the physical quantity measuring device 100 includes an optical sensor 1, a broadband light source 2, an optical cable 3, a light receiver 4, and a circulator 7.

The optical sensor 1 is a sensor configured to detect pressure of a target fluid. Details of the optical sensor 1 will be described later.

Broadband Light Source 2

The broadband light source 2 emits light having a broadband wavelength. Note that the broadband light source 2 is an exemplary light source of the invention.

In the exemplary embodiment, the broadband light source 2 is, for example, a super continuum (SC) light source, and is configured to emit light in a wavelength region of approximately 1,200 nm to 1,600 nm. Note that the broadband light source 2 is not necessarily configured as described above, but may be a combination of, for example, an amplified spontaneous emission (ASE) light source, a super luminescent diode (SLD) light source, and a light emitting diode (LED) light source. Alternatively, the broadband light source 2 may be a narrowband light source that sweeps a broadband range (e.g. a tunable laser). Further alternatively, the broadband light source 2 may be configured to emit light in a wavelength region broader or narrower than the exemplified wavelength region.

Optical Cable 3

The optical cable 3 includes, for example, a so-called multimode optical fiber and a protecting member, and light emitted from the broadband light source 2 is incident on the optical cable 3. The light emitted by the broadband light source 2 is transmitted to the optical sensor 1 through the optical cable 3. A first interference light and a second interference light output from the optical sensor 1 are transmitted to the light receiver 4 through the optical cable 3. Note that the optical cable 3 is not necessarily provided with the multimode optical fiber but is optionally provided with, for example, a single-mode optical fiber.

Circulator 7

The light emitted from the broadband light source 2 is incident on the circulator 7, and the circulator 7 transmits the incident light to the optical sensor 1. Further, the interference light output from the optical sensor 1 is incident on the circulator 7, and the circulator 7 transmits the incident light to the light receiver 4.

Note that the circulator 7 is not necessarily configured as described above but is optionally in a form of, for example, a beam splitter.

Optical Sensor 1

Figure 2:
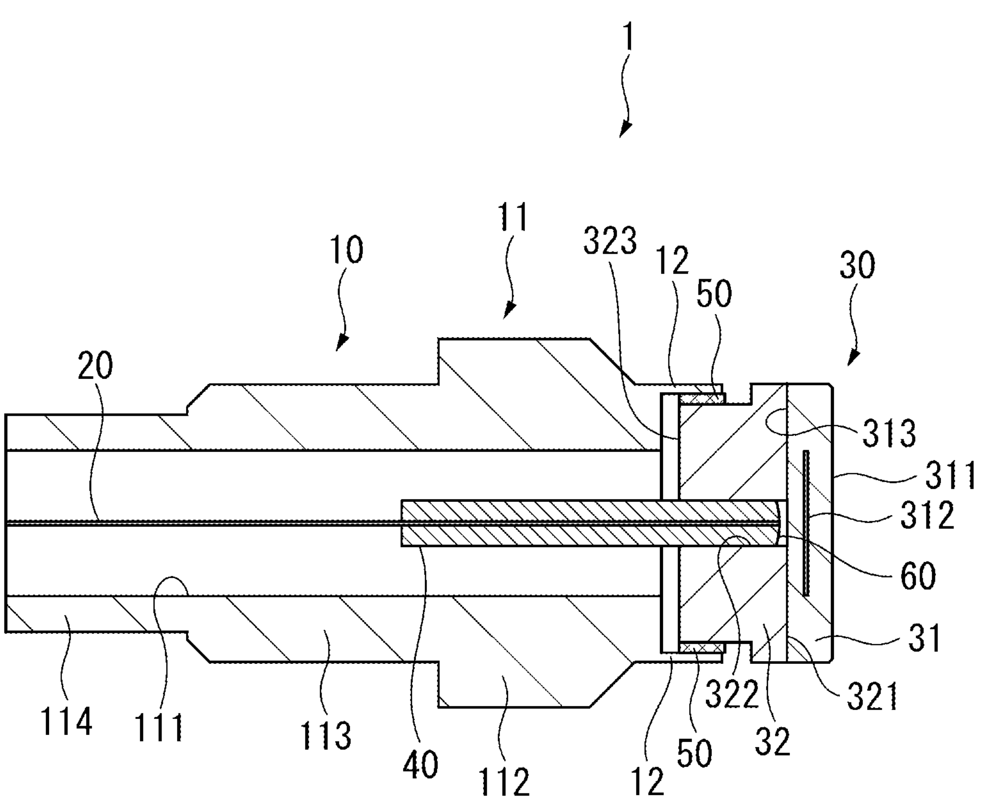
FIG. 2 is a cross-sectional view schematically illustrating an optical sensor of the first exemplary embodiment.
Figure 3:
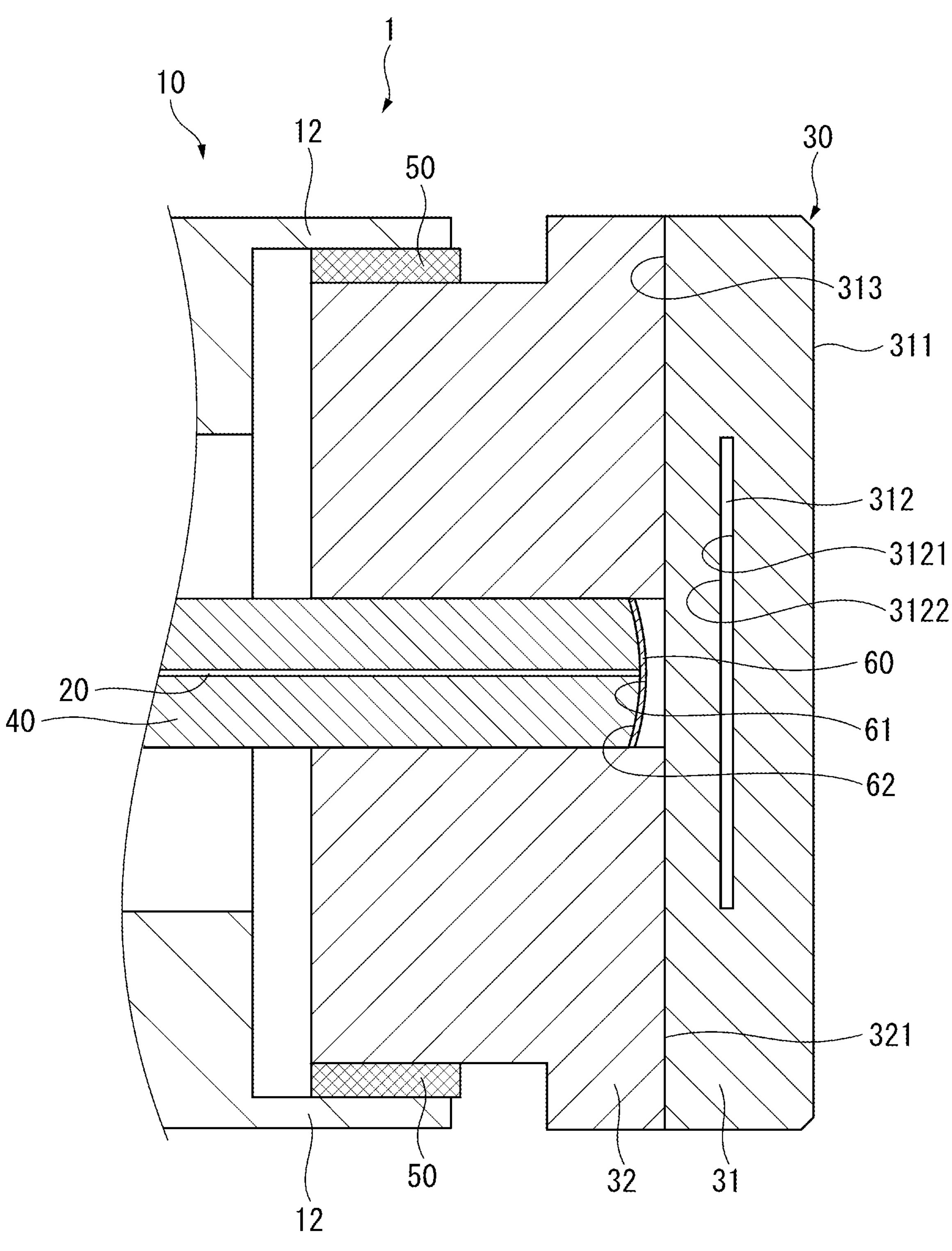
FIG. 3 is an enlarged cross-sectional view schematically illustrating a main portion of the optical sensor of the first exemplary embodiment.

FIG. 2 is a cross-sectional view schematically illustrating the optical sensor 1. FIG. 3 is a cross-sectional view schematically illustrating a main portion of the optical sensor 1.

As illustrated in FIGS. 2 and 3, the optical sensor 1 includes a base 10, an optical fiber member 20, a sensor head 30, a ferrule 40, a bonding member 50, and a dielectric film 60.

Base 10

The base 10, which is formed from a metal, includes a base body 11 and a fitting portion 12.

In the exemplary embodiment, the base 10 is formed from, for example, stainless steel. This makes it possible to form a shape of the base 10 by machining, such as cutting, making the processing of the base 10 easy. Note that the base 10 is not necessarily configured as described above, but is optionally formed from, for example, a metal, such as titanium or a nickel alloy.

The base body 11, which is formed into a cylindrical shape, is provided therein with a through hole 111. The base body 11 includes a first cylindrical portion 112, a second cylindrical portion 113, and a third cylindrical portion 114.

Note that the shape of base body 11 is not limited to the cylindrical shape, but may be, for example, a shape of a polygonal pipe.

The first cylindrical portion 112, which is provided close to a distal end of the base body 11, has the largest diameter in the base body 11. The fitting portion 12 is provided at a first end of the first cylindrical portion 112, and the second cylindrical portion 113 is provided at a second end of the first cylindrical portion 112. Further, a distal end of the first cylindrical portion 112 is tapered.

The second cylindrical portion 113 is provided between the first cylindrical portion 112 and the third cylindrical portion 114 in the base body 11. A diameter of the second cylindrical portion 113 is smaller than that of the first cylindrical portion 112 and larger than that of the third cylindrical portion 114.

The third cylindrical portion 114, which is provided close to a proximal end of the base body 11, has the smallest diameter in the base body 11. In the base body 11 of the exemplary embodiment configured as described above, a nut member (not illustrated) may be disposed close to an outer circumferential surface of the second cylindrical portion 113 after bonding an inner circumferential surface of a pipe (not illustrated) to an outer circumferential surface of the third cylindrical portion 114.

Note that the base body 11 is not necessarily configured as described above but may be formed to have a constant diameter from a first end to a second end thereof.

The fitting portion 12, which is formed into a cylindrical shape, is provided at an end close to the distal end of the first cylindrical portion 112. In the exemplary embodiment, the fitting portion 12 is integrally formed with the base body 11. At an inner circumference side of the fitting portion 12, the sensor head 30 is inserted and bonded. Note that a method of bonding the sensor head 30 is described in detail below.

Optical Fiber Member 20

The optical fiber member 20 is installed in the through hole 111 of the base body 11. In the exemplary embodiment, the optical fiber member 20, which is configured by a so-called multimode optical fiber, is provided in a manner continuous with the optical fiber of the optical cable 3. Thus, the optical fiber member 20 is optically connected with the broadband light source 2. Note that the optical fiber member 20 is not necessarily continuous with the optical fiber of the optical cable 3. For example, the optical fiber member 20 may be connected with the optical fiber of the optical cable 3 through a connector or the like.

The light incident on the optical fiber member 20 through the optical cable 3 is transmitted to the sensor head 30 through the optical fiber member 20. Further, the interference light output from the sensor head 30 is transmitted to the optical cable 3 through the optical fiber member 20. Note that the optical fiber member 20 is an exemplary optical waveguide of the invention.

The optical fiber member 20 is not necessarily provided by the multimode optical fiber but is optionally provided by, for example, a single-mode optical fiber.

Sensor Head 30

The sensor head 30, which is formed into a columnar shape, is inserted into and bonded to the fitting portion 12 of the base 10 as described above. In the exemplary embodiment, the sensor head 30 includes a head portion 31 and a columnar portion 32.

Head Portion 31

The head portion 31 is a columnar-shaped component formed from monocrystalline alumina in a form of sapphire. The head portion 31 is provided close to a distal end of the sensor head 30. In the exemplary embodiment, the head portion 31 has a contact surface 311, a cavity 312, and a bonding surface 313.

The contact surface 311, which is a distal end surface of the head portion 31, comes into contact with the target fluid.

The cavity 312 is formed, for example, by bonding a first columnar-shaped member having a recess formed by a micro electro mechanical system (MEMS) or machining to a second columnar-shaped member to provide the head portion 31. In the exemplary embodiment, the inside of the cavity 312 is in a vacuum state.

The cavity 312 has a first reflection surface 3121 and a second reflection surface 3122. A portion of the light output from the optical fiber member 20 is reflected on the first reflection surface 3121. The second reflection surface 3122 is provided opposite to the first reflection surface 3121. A portion of the light output from the optical fiber member 20 is reflected on the second reflection surface 3122. The light reflected on the first reflection surface 3121 and the light reflected on the second reflection surface 3122 interfere with each other, whereby a first interference light is output from the cavity 312. Note that the first interference light is an exemplary interference light of the invention.

The cavity 312 may be formed such that light is multiply-reflected on the first reflection surface 3121 and the second reflection surface 3122 and the multiply-reflected light beams interfere with each other. Note that the inside of the cavity 312 is not limited to being in the vacuum state, but, for example, air or other substances may be present in the cavity 312.

The bonding surface 313, which is disposed close to a proximal end of the head portion 31, is bonded to a distal end surface 321 of the columnar portion 32 described below.

Columnar Portion 32

The columnar portion 32, which is formed into a columnar shape, is provided close to a proximal end of the sensor head 30. In the exemplary embodiment, the columnar portion 32 is a columnar-shaped component formed from monocrystalline alumina in a form of sapphire. The columnar portion 32 has the distal end surface 321, an insertion hole 322, and a proximal end surface 323.

The distal end surface 321, which is a surface close to is a distal end of the columnar portion 32, faces the bonding surface 313 of the head portion 31. In the exemplary embodiment, the distal end surface 321 is bonded to the bonding surface 313 of the head portion 31 by fusion bonding. The head portion 31 and the columnar portion 32 are thus bonded to each other.

Note that the bonding surface 313 and the distal end surface 321 are not necessarily bonded by the fusion bonding, and may be bonded by, for example, ADB or SAB.

The insertion hole 322 is formed to extend through a central portion of the columnar portion 32. In the exemplary embodiment, the optical fiber member 20 and the ferrule 40 are inserted into the insertion hole 322.

The proximal end surface 323, which is a surface close to a proximal end of the columnar portion 32, is provided opposite to the first cylindrical portion 112 of the base body 11.

In the exemplary embodiment, the bonding member 50 is disposed on an outer circumferential surface of the columnar portion 32. With the columnar portion 32 being inserted into the fitting portion 12 of the base 10, the outer circumferential surface of the columnar portion 32 is bonded to the fitting portion 12 via the bonding member 50. The sensor head 30 and the base 10 are thus firmly bonded to each other.

In the exemplary embodiment, the proximal end surface 323 of the columnar portion 32 and the base body 11 are not in contact with each other. Specifically, a space is left between the columnar portion 32 and the base body 11.

Details of the bonding member 50 interposed between the columnar portion 32 and the fitting portion 12 is described below.

Ferrule 40

The ferrule 40 is a member that supports the optical fiber member 20.

In the exemplary embodiment, the ferrule 40 has a hole (not illustrated) penetrating therethrough. The hole extends from a first end to a second end of the ferrule 40. The optical fiber member 20 is inserted into the hole of the ferrule 40. The ferrule 40 thus supports the optical fiber member 20.

In the exemplary embodiment, a portion close to the distal end of the ferrule is disposed in the insertion hole 322 of the columnar portion 32. The dielectric film 60 is provided at the distal end of the ferrule 40. Specifically, the dielectric film is provided at the distal end of the ferrule 40 inside the insertion hole 322. Here, in the exemplary embodiment, the ferrule 40 supports the dielectric film 60 so that the dielectric film 60 and the bonding surface 313 of the head portion 31 do not contact each other. Specifically, the ferrule 40 supports the dielectric film 60 such that the bonding surface 313 of the head portion 31 is arranged apart from the dielectric film 60 by approximately 100 μm.

The dielectric film 60 is described in detail below.

Bonding Member 50

As described above, the bonding member 50 is a member interposed between the columnar portion 32 and the fitting portion 12. The columnar portion 32 is bonded to the fitting portion 12 via the bonding member 50. In the exemplary embodiment, the bonding member 50 is provided by a brazing material. Specifically, the bonding member 50 is provided by an Au—Cu brazing material or an Ag—Cu brazing material.

In the exemplary embodiment, Mo—Mn plating is provided on a surface of the columnar portion 32 facing the bonding member 50, and Ni plating is further provided on the Mo—Mn plating. In other words, the surface of the columnar portion 32 facing the bonding member 50 is metallized by a so-called metallizing method. This makes it possible to firmly bond the columnar portion 32 formed from sapphire to the bonding member 50, which consequently makes it possible to firmly bond the fitting portion 12 of the base 10 formed from a metal such as stainless steel to the columnar portion 32 via the bonding member 50.

The bonding member 50 is not necessarily configured as described above but may be provided, for example, by glass or ceramic, as long as the fitting portion 12 is firmly bondable to the columnar portion 32 via the bonding member 50.

Dielectric Film 60

The dielectric film 60 is in a form of a dielectric single-layered film. In the exemplary embodiment, the dielectric film 60 has a third reflection surface 61 and a fourth reflection surface 62.

A portion of the light incident on the third reflection surface 61 through the optical fiber member 20 is reflected on the third reflection surface 61. A portion of the light incident on the fourth reflection surface 62 through the optical fiber member is reflected on the fourth reflection surface 62. The light reflected on the third reflection surface 61 and the light reflected on the fourth reflection surface 62 interfere with each other, whereby a second interference light is output from the dielectric film 60. The dielectric film 60 may be formed such that light is multiply-reflected on the third reflection surface 61 and the fourth reflection surface 62 and the multiply-reflected beams interfere with each other.

The dielectric film 60 is not necessarily configured as described above but may be in a form of a multi-layered film in which a plurality of dielectric layers are layered.

As described above, since a space is left between the dielectric film 60 and the head portion 31 of the sensor head 30, pressure of the target fluid does not propagate to the dielectric film 60. A distance between the third reflection surface 61 and the fourth reflection surface 62 is thus not likely to be affected by the pressure of the target fluid. On the other hand, the film thickness of the dielectric film 60 is affected by the temperature of the target fluid. That is, the distance between the third reflection surface 61 and the fourth reflection surface 62 depends on the temperature of the target fluid. In this configuration, the second interference light is output from the dielectric film 60 depending on the temperature of the target fluid.

In the cavity 312 of the head portion 31, a distance between the first reflection surface 3121 and the second reflection surface 3122 depends on the pressure and the temperature of the target fluid. That is, the first interference light is output from the cavity 312 depending on the pressure and the temperature of the target fluid.

Referring back to FIG. 1, the first interference light and the second interference light output from the optical sensor 1 are incident on the light receiver 4, and the light receiver 4 calculates a physical quantity corresponding to the first interference light and the second interference light. The light receiver 4 includes a light detector 5 and an MPU 6.

The light detector 5, which includes a light-detecting element, photoelectric transducer, amplifier, AD converter, and the like (all of which are not illustrated), detects the first interference light and second interference light incident thereon to output a first interference signal and a second interference signal. Note that the first interference signal and the second interference signal are each an exemplary interference signal of the invention.

The MPU 6, a so-called micro processing unit, receives a plurality of interference signals output from the light detector 5 to calculate the physical quantity according to the respective interference signals. In the exemplary embodiment, the MPU 6 measures the physical quantity based on the first interference signal and the second interference signal using typically known calculation method(s). Specifically, the MPU 6 determines an interference pattern (interference fringe) based on each of the first interference signal and the second interference signal. The MPU 6 then calculates a phase variation based on a periodical change in the intensity of the interference pattern. The MPU 6 determines a correlation between the phase variation and the physical quantity in advance, and calculates the physical quantity corresponding to the phase variation. Note that the MPU 6 is an exemplary arithmetic unit of the invention.

In the exemplary embodiment, as described above, the first interference light is affected by the pressure and the temperature of the target fluid. The first interference signal thus depends mainly on the pressure of the target fluid, and also depends on the temperature of the target fluid.

In contrast, the second interference light is affected by the temperature of the target fluid, but insusceptible to the pressure of the target fluid. The second interference signal thus depends mainly on the temperature of the target fluid.

Accordingly, the MPU 6 can calculate the pressure of the target fluid by subtracting the calculated physical quantity based on the second interference signal from the calculated physical quantity based on the first interference signal. In other words, since the pressure obtained based on the first interference light of the cavity 312 can be temperature-compensated, the measurement accuracy for the pressure of the target fluid can be improved.

The following effects can be achieved by the first exemplary embodiment.

(1) In the exemplary embodiment, the base 10 includes the fitting portion 12 into which the sensor head 30 is inserted. With the sensor head 30 inserted into the fitting portion 12 of the base 10, the fitting portion 12 is bonded to the sensor head via the bonding member 50. This makes it possible to firmly bond the sensor head 30 to the base 10.

The sensor head 30 is formed from sapphire having high physical/chemical strength, thus inhibiting the sensor head 30 from being damaged even when the temperature and pressure of the target fluid are high. Further, since the base 10 is formed from a metal, such as stainless steel, processing of the base 10 is easier than a case where the base 10 is formed, for example, from sapphire, at lower manufacturing costs. Accordingly, it is possible to provide the optical sensor 1 with high physical/chemical strength that is easy to be processed.

(2) In the exemplary embodiment, the head portion 31 of the sensor head 30 that comes into contact with the target fluid has the cavity 312 from which the first interference light obtained by interference between the light reflected on the first reflection surface 3121 and the light reflected on the second reflection surface 3122 is output to the optical fiber member 20. The distance between the first reflection surface 3121 and the second reflection surface 3122 depends on the pressure of the target fluid. The pressure of the target fluid is thus detectable by analyzing the first interference light.

(3) In the sensor head 30 of the exemplary embodiment, the columnar portion 32 to be bonded to the head portion 31 is inserted into the fitting portion 12 and bonded thereto via the bonding member 50.

If the head portion 31 is inserted into the fitting portion 12 and is bonded thereto via the bonding member 50, the cavity 312 may be deformed due to stress acting on the head portion 31. Such a deformation of the cavity 312 may cause an error in the detection of the pressure of the target fluid.

In the exemplary embodiment, the head portion 31 is not bonded to the fitting portion 12, inhibiting the occurrence of an error that may otherwise be caused by the bonding of the head portion 31 to the fitting portion 12.

(4) In the exemplary embodiment, the optical sensor 1 outputs, in addition to the first interference light output from the cavity 312, the second interference light obtained by interference between the light reflected on the third reflection surface 61 of the dielectric film 60 and the light reflected on the fourth reflection surface 62 of the dielectric film 60. The pressure obtained from the first interference light can thus be temperature-compensated, which improves the pressure measurement accuracy.

Second Exemplary Embodiment

Next, a second exemplary embodiment of the invention is described below based on the drawings.

The second exemplary embodiment differs from the first exemplary embodiment in that a supporting portion 13A is provided close to a distal end of a base 10A. Note that components in the second exemplary embodiment that are the same or similar to those in the first exemplary embodiment are demoted by the same reference numerals to omit detailed description thereof.

Optical Sensor 1A

Figure 4:
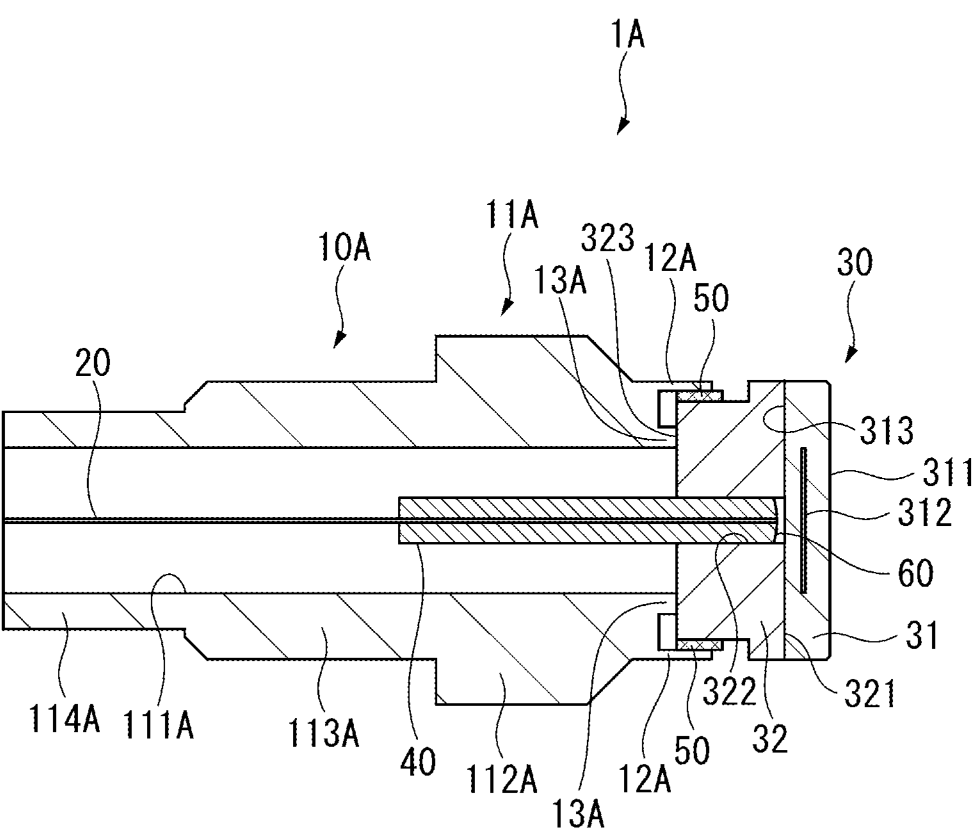
FIG. 4 is a cross-sectional view schematically illustrating an optical sensor of a second exemplary embodiment.
Figure 5:
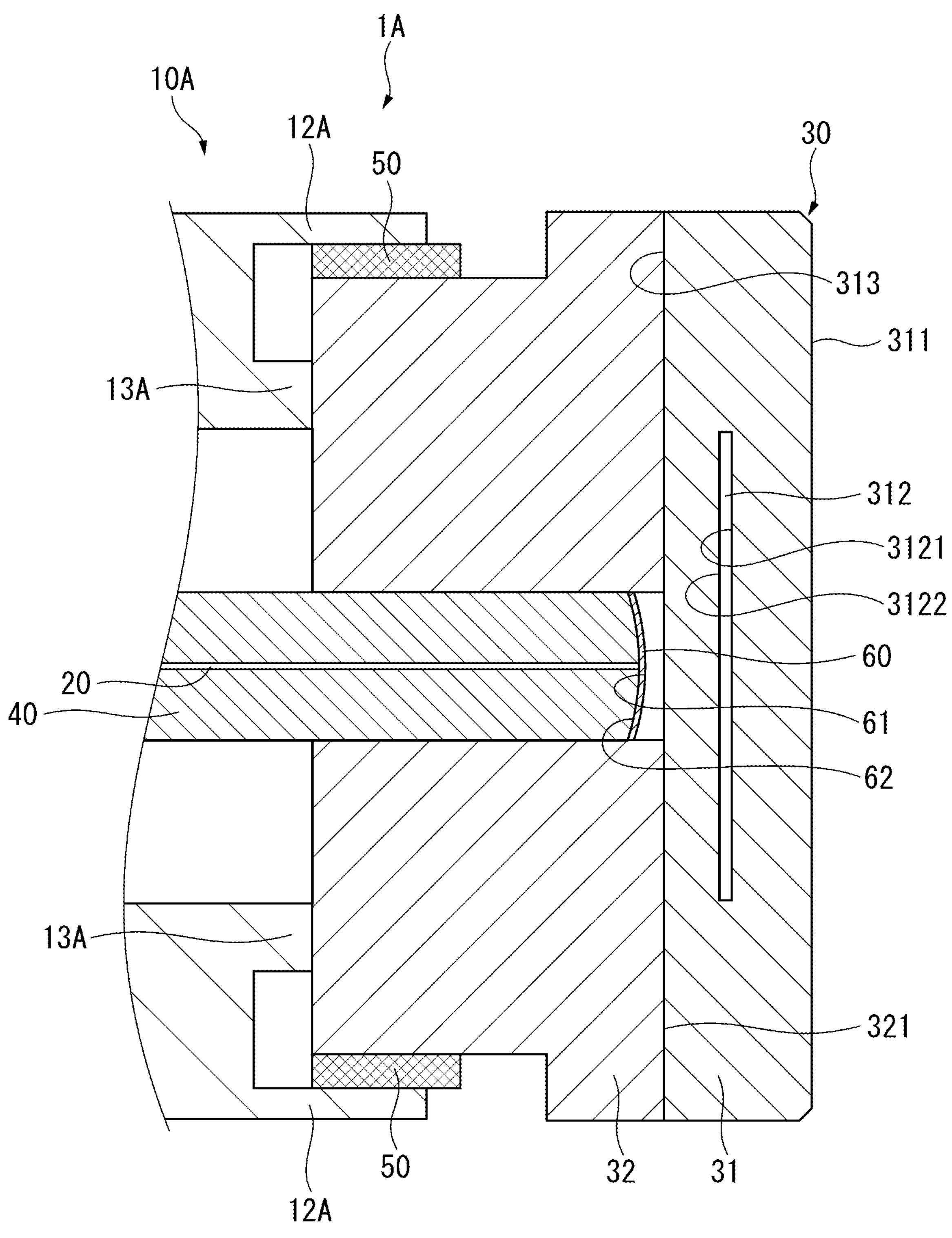
FIG. 5 is an enlarged cross-sectional view schematically illustrating a main portion of the optical sensor of the second exemplary embodiment.

FIG. 4 is a cross-sectional view schematically illustrating an optical sensor 1A of the exemplary embodiment. FIG. 5 is a cross-sectional view schematically illustrating a main portion of the optical sensor 1A.

As illustrated in FIGS. 4 and 5, the optical sensor 1A includes the base 10A, the optical fiber member 20, the sensor head 30, the ferrule 40, and the bonding member 50.

Base 10A

Similar to the first exemplary embodiment, the base 10A is formed from a metal, such as stainless steel. In the exemplary embodiment, the base 10A includes a base body 11A, a fitting portion 12A, and the supporting portion 13A.

Similar to the first exemplary embodiment, the base body 11A, which is formed into a cylindrical shape, is provided therein with a through hole 111A. The base body 11A includes a first cylindrical portion 112A, a second cylindrical portion 113A, and a third cylindrical portion 114A. In the exemplary embodiment, the supporting portion 13A, which protrudes toward the sensor head 30, is provided close to a distal end of the first cylindrical portion 112A.

Supporting Portion 13A

As described above, the supporting portion 13A protrudes toward the sensor head 30 from a portion close to the distal end of the first cylindrical portion 112A. In the exemplary embodiment, the supporting portion 13A, which is formed into a cylindrical shape along an opening of the through hole 111A, is integrally formed with the base body 11A. A surface close to a distal end of the supporting portion 13A is in contact with the proximal end surface 323 of the columnar portion 32 of the sensor head 30, allowing the supporting portion 13A to support the sensor head 30. In this configuration, even when high stress acts on the sensor head 30, the high stress can be supported by the supporting portion 13A. Since stress acting on a bonding portion where the columnar portion 32 is bonded to the fitting portion 12A can be distributed, the sensor head 30 can be more firmly bonded to the base 10A.

The following effects can be achieved by the second exemplary embodiment.

(5) In the exemplary embodiment, the supporting portion 13A that supports the sensor head 30 is provided for the base 10A. In this configuration, even when high stress acts on the sensor head 30, the high stress can be supported by the supporting portion 13A. This makes it possible to more firmly bond the sensor head to the base 10A.

Third Exemplary Embodiment

Next, a third exemplary embodiment of the invention is described below based on the drawings.

The third exemplary embodiment differs from the first and second exemplary embodiments in that a supporting portion 13B of a base 10B is bonded to the sensor head 30 via a welding member. Note that components in the third exemplary embodiment that are the same or similar to those in the first and second exemplary embodiments are demoted by the same reference numerals to omit detailed description thereof.

Optical Sensor 1B

Figure 6:
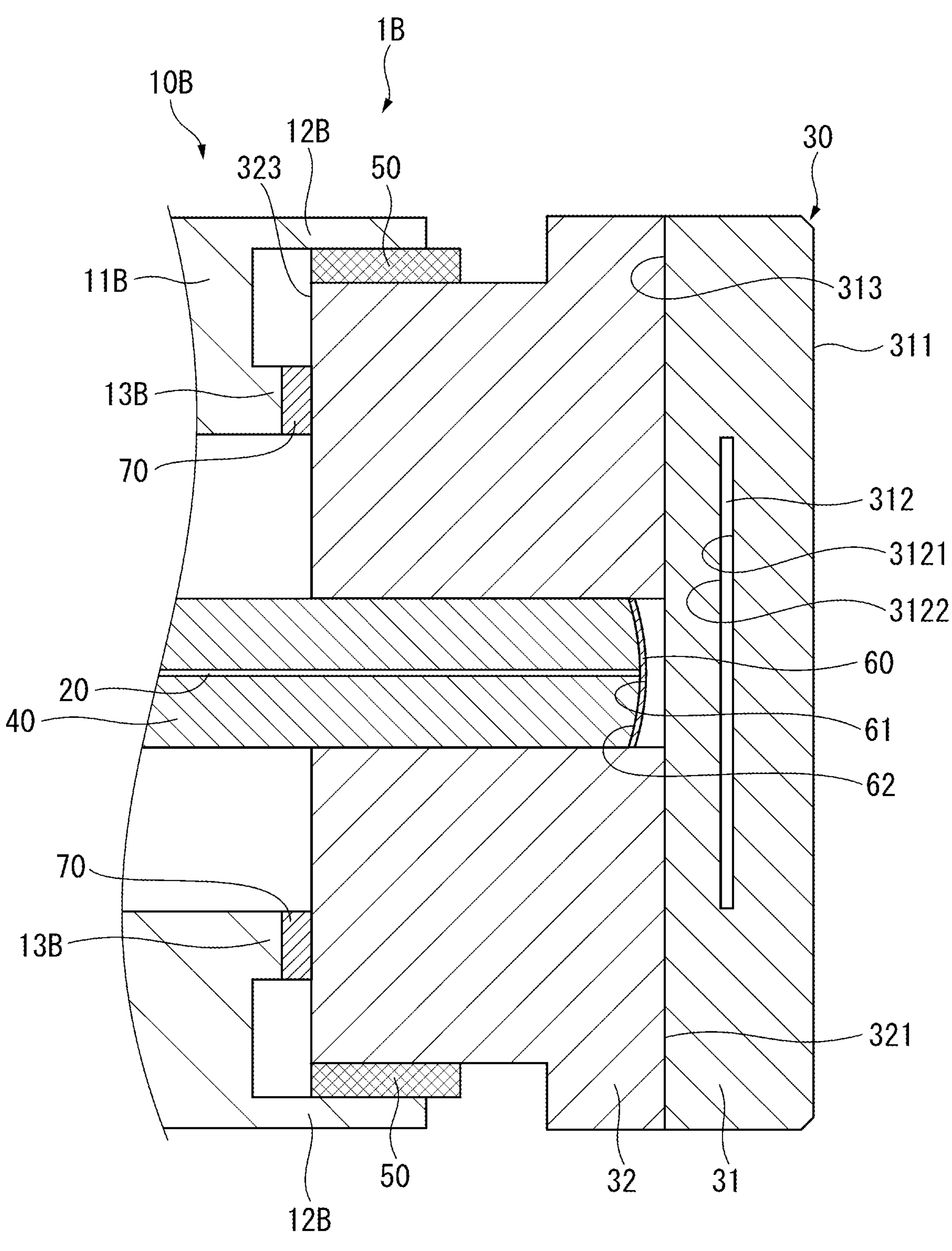
FIG. 6 is an enlarged cross-sectional view schematically illustrating a main portion of an optical sensor of a third exemplary embodiment.

FIG. 6 is an enlarged cross-sectional view schematically illustrating a main portion of an optical sensor 1B of the exemplary embodiment.

As illustrated in FIG. 6, the optical sensor 1B includes the base 10B, the optical fiber member 20, the sensor head 30, the ferrule 40, the bonding member and a welding member 70.

Supporting Portion 13B

Similar to the supporting portion 13A of the second exemplary embodiment, the supporting portion 13B formed into a cylindrical shape protrudes toward the sensor head 30 from a portion close to a distal end of a base body 11B. In the exemplary embodiment, a distal end surface of the supporting portion 13B is bonded to the proximal end surface 323 of the columnar portion 32 of the sensor head 30 by the welding member 70. In this configuration, the sensor head 30 is fixed to the supporting portion 13B via the welding member 70 while being supported by the supporting portion 13B of the base 10B. This makes it possible to reliably fix the sensor head 30 even when high stress acts on the sensor head 30.

Note that the welding member 70 may be in a form of a brazing material or a solder material. The welding member 70 may be any member as long as the sensor head 30 is bonded to the supporting portion 13B via the welding member The following effects can be achieved by the third exemplary embodiment.

(6) In the exemplary embodiment, the distal end surface of the supporting portion 13B is bonded to the columnar portion 32 of the sensor head 30 by the welding member 70. This makes it possible to reliably fix the sensor head 30 even when high stress acts on the sensor head 30.

Fourth Exemplary Embodiment

Next, a fourth exemplary embodiment of the invention is described below based on the drawings.

The fourth exemplary embodiment differs from the first to third exemplary embodiments in that a connecting portion 14C, of which inner circumferential surface has a curved shape, is provided between a base body 11C and a fitting portion 12C. Note that components in the fourth exemplary embodiment that are the same or similar to those in the first to third exemplary embodiments are demoted by the same reference numerals to omit detailed description thereof.

Optical Sensor 1C

Figure 7:
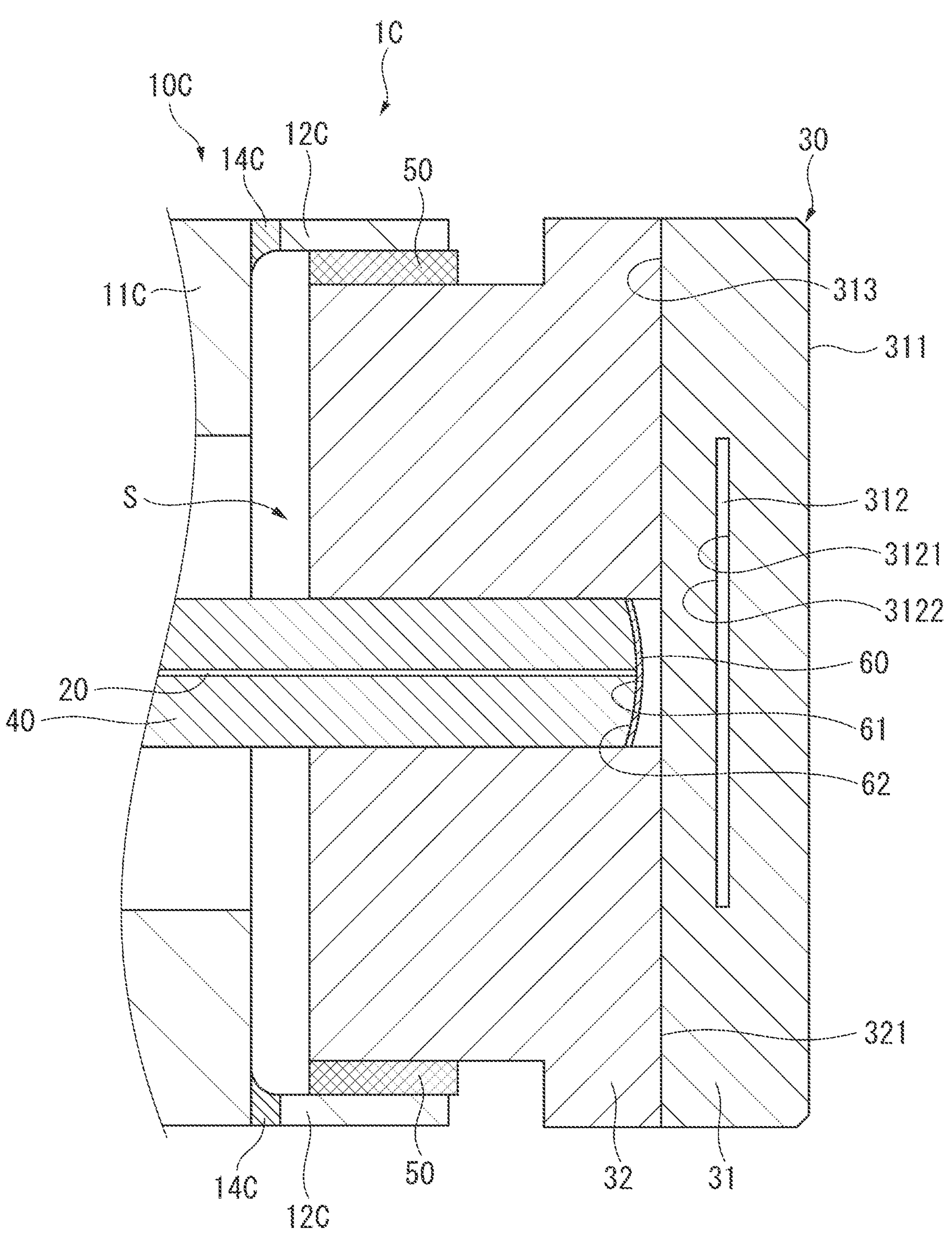
FIG. 7 is an enlarged cross-sectional view schematically illustrating a main portion of an optical sensor of a fourth exemplary embodiment.

FIG. 7 is an enlarged cross-sectional view schematically illustrating a main portion of an optical sensor 1C of the exemplary embodiment.

As illustrated in FIG. 7, the optical sensor 1C includes a base 10C, the optical fiber member 20, the sensor head 30, the ferrule 40, and the bonding member 50.

Base 10C

Similar to the first to third exemplary embodiments, the base 10C is formed from a metal, such as stainless steel. In the exemplary embodiment, the base 10C includes the base body 11C, the fitting portion 12C, and the connecting portion 14C.

Similar to the first to third exemplary embodiments, the base body 11C is formed into a cylindrical shape. In the exemplary embodiment, the connecting portion 14C is provided between the base body 11C and the fitting portion 12C.

Connecting Portion 14C

The connecting portion 14C, which is formed into substantially cylindrical shape, extends from the base body 11C along an outer circumference of the base body 11C. The fitting portion 12C is provided continuously with the connecting portion 14C at a side close to a distal end of the connecting portion 14C. In this configuration, a space S is formed between the sensor head 30 and the base body 11C, the space S being defined by the base body 11C, the connecting portion 14C, the fitting portion 12C, and the sensor head 30.

The connecting portion 14C is larger in thickness than the fitting portion 12C. Specifically, the thickness of the connecting portion 14C is larger from the fitting portion 12C toward the base body 11C. An inner circumferential surface of the connecting portion 14C exposed to the space S has a curved shape.

In this configuration, even when high stress acts on the sensor head 30, the high stress can be inhibited from concentrating on between the base body 11C and the fitting portion 12C. That is, in the exemplary embodiment, stress is less likely to concentrating on between the base body 11C and the fitting portion 12C than a case where a corner is provided between the base body 11C and the fitting portion 12C.

Further, in the exemplary embodiment, the space S, which is defined by the base body 11C, the connecting portion 14C, the fitting portion 12C, and the sensor head 30, inhibits the fitting portion 12C from being damaged which may otherwise be caused by the contact between a corner of the sensor head 30 and the fitting portion 12C.

The following effects can be achieved by the fourth exemplary embodiment.

(7) In the exemplary embodiment, the inner circumferential surface of the connecting portion 14C provided between the base body 11C and the fitting portion 12C has a curved shape. This makes it possible to inhibit stress from concentrating on between the base body 11C and the fitting portion 12C compared, for example, to a case where a corner is provided between the base body 11C and the fitting portion 12C. Thus, a proximal end of the fitting portion 12C is inhibited from being damaged which may otherwise be caused by stress concentration.

Modifications

Note that the invention is not limited to the above exemplary embodiments but includes modifications, improvements, and the like as long as an object of the invention can be achieved.

In each of the above exemplary embodiments, the ferrule 40 has the hole into which the optical fiber member 20 is inserted. The invention, however, is not limited thereto. For example, the optical fiber member may be connected to an end of a light-transmissive ferrule and light output from the optical fiber member may be incident on the sensor head through the ferrule.

In each of the above exemplary embodiments, the columnar portion 32 of the sensor head 30 is formed from monocrystalline alumina in a form of sapphire. The invention, however, is not limited thereto. For example, the columnar portion of the sensor head may be formed from a metal, such as stainless steel, or ceramics. In this configuration, the sensor head may be formed by bonding the head portion formed from monocrystalline alumina in a form of sapphire to the columnar portion formed from a metal, ceramics, or the like.

In each of the above exemplary embodiments, the head portion 31 of the sensor head 30 includes one cavity 312. The invention, however, is not limited thereto. For example, the head portion of the sensor head may include a plurality of cavities. In this configuration, a plurality of physical quantities may be detected or temperature compensation may be performed by analyzing interference light beams output from the respective cavities.

In each of the above exemplary embodiments, the sensor head 30 is formed into a columnar shape. The invention, however, is not limited thereto. For example, the sensor head may be formed into a prismatic shape, such as a quadrangular prism or a hexagonal prism. In this configuration, the fitting portion provided for the base is formed into a shape of polygonal pipe, such as a quadrangular pipe and a hexagonal pipe.

In each of the above exemplary embodiments, the temperature is measured based on the second interference light and the pressure obtained from the first interference light is temperature-compensated. The invention, however, is not limited thereto. For example, a thermocouple and a resistance temperature detector for measuring the temperature of the target fluid may be provided and the pressure may be temperature-compensated based on an output value of the temperature detector. In other words, the temperature may be measurable through an optical or electrical means.

In each of the above exemplary embodiments, the pressure obtained from the first interference light is temperature-compensated based on the second interference light output from the dielectric film 60. The invention, however, is not limited thereto. For example, the pressure obtained from the first interference light may be temperature-compensated based on interference light obtained by interference between the light reflected on the second reflection surface 3122 and the light reflected on the bonding surface 313.

Further, the invention also includes a case in which the pressure obtained from the first interference light is not temperature-compensated.

In each of the above exemplary embodiments, the optical waveguide is provided by the optical fiber member 20. The invention, however, is not limited thereto. For example, the optical waveguide may be provided by a light transmissive member formed from, for example, a crystalline material.

In each of the above exemplary embodiments, a part close to the distal end of the first cylindrical portion of the base body may be cut into an annular shape along its outer circumference, and an annular ring body corresponding to the cut portion may be disposed around the first cylindrical portion. The ring body may be bonded to an uncut portion (stepped portion) close to a proximal end of the first cylindrical portion, forming a space between an inner circumferential surface of the ring body and an outer circumferential surface of the first cylindrical portion at the cut portion. In this configuration, even when the ring body disposed around the outer circumference of the first cylindrical portion is distorted due to stress acting thereon, the distortion is inhibited from being transmitted to the sensor head through the first cylindrical portion and the fitting portion. This makes it possible to inhibit a decrease in detection accuracy of the physical quantity which may otherwise be caused by the distortion of the sensor head.

In the fourth exemplary embodiment, a supporting portion that supports the sensor head may be provided in the base as in the second exemplary embodiment. Further, the supporting portion may be bonded to the sensor head by a welding member as in the third exemplary embodiment.

In each of the above exemplary embodiments, the optical sensor 1, 1A, 1B, or 1C is configured to detect the pressure of the target fluid. The invention, however, is not limited thereto. For example, the optical sensor may be configured to detect a physical quantity, such as distortion.

The invention claimed is:

1. An optical sensor, comprising:

a metal base formed into a cylindrical shape;

an optical waveguide inserted into the base; and a sensor head that is bonded to the base and is optically connected to the optical waveguide, the sensor head comprising a distal head formed from monocrystalline alumina, wherein the base comprises a fitting, said fitting having a cylindrical shape into which the sensor head is inserted, the sensor head is formed from monocrystalline alumina and comprises a proximal end formed into a columnar shape, the proximal end of the sensor head being inserted into the fitting, and a circumferential surface of the proximal end of the sensor head is bonded to the fitting, and the distal head of the sensor head is not inserted into the fitting and projects outwardly away from the fitting.

2. The optical sensor according to claim 1, wherein the distal head is provided with a cavity having a first reflection surface on which a portion of light introduced from the optical waveguide is reflected and a second reflection surface on which a portion of the light introduced from the optical waveguide is reflected, the first reflection surface being provided opposite to the second reflection surface, and interference light obtained by interference between the light reflected on the first reflection surface and the light reflected on the second reflection surface is output from the cavity to the optical waveguide.

3. The optical sensor according to claim 2, wherein a distance between the first reflection surface and the second reflection surface depends on pressure of a target fluid.

4. The optical sensor according to claim 1, wherein the base comprises a support, said support being formed into a cylindrical shape and supporting the sensor head.

5. The optical sensor according to claim 4, wherein the support is bonded to the sensor head via a welding member.

6. The optical sensor according to claim 1, wherein the base comprises a base body into which the optical waveguide is inserted and a connector extending from the base body, and the fitting is provided at a side close to a distal end of the connector, the connector is formed into a cylindrical shape along an outer circumference of the base body, the base body, the connector, the fitting, and the sensor head define a space, and the connector is larger in thickness than the fitting, and an inner circumferential surface of the connector exposed to the space has a curved shape.

7. A physical quantity measuring device, comprising:

a light source;

an optical sensor comprising: a metal base formed into a cylindrical shape; an optical waveguide that is optically connected to the light source and is inserted into the base; and a sensor head that is bonded to an end of the base and is optically connected to the optical waveguide, the sensor head comprising a distal head formed from monocrystalline alumina;

a light detector configured to detect an interference signal from interference light output from the optical sensor; and an arithmetic unit configured to calculate a physical quantity of a target fluid from the interference signal detected by the light detector, the arithmetic unit being configured as a Micro Processing Unit, wherein the base comprises a fitting formed into a cylindrical shape into which the sensor head is inserted, the sensor head is formed from monocrystalline alumina and comprises a proximal end formed into a columnar shape, the proximal end of the sensor head being inserted into the fitting, and a circumferential surface of the proximal end of the sensor head is bonded to the fitting, and the distal head of the sensor head is not inserted into the fitting and projects outwardly away from the fitting.

8. The optical sensor according to claim 1, further comprising a bonding member provided by a brazing material, said bonding member being disposed on an outer circumferential surface of the proximal end of the sensor head and serving to connect the proximal end of the sensor head to the fitting.

9. The physical quantity measuring device according to claim 7, further comprising a bonding member provided by a brazing material, said bonding member being disposed on an outer circumferential surface of the proximal end of the sensor head and serving to connect the proximal end of the sensor head to the fitting.

* * * * *